Jan. 4, 1966  F. D. STINE  3,227,631
AUTOMATIC FEED FORWARD AND FEED BACKWARD PROCESS CONTROL SYSTEM
Filed July 3, 1961

INVENTOR.
F. D. STINE
BY Hudson & Young
ATTORNEYS

United States Patent Office 3,227,631
Patented Jan. 4, 1966

3,227,631
AUTOMATIC FEED FORWARD AND FEED
BACKWARD PROCESS CONTROL SYSTEM
Forrest D. Stine, Bartlesville, Okla., assignor to Phillips
Petroleum Company, a corporation of Delaware
Filed July 3, 1961, Ser. No. 121,630
5 Claims. (Cl. 203—3)

This invention relates to an improved method of and apparatus for controlling a process.

In a conventional process feedback control system, a process variable is adjusted in response to a measured output variable. If, for example, the rate of flow of a raw feed to a fractionation zone is adjusted in response to an analysis of an overhead product stream, the effectiveness of this control is dependent upon the characteristics of the fractionation process. The characteristics of the fractionation process are manifested by the fractionation product response to changes in a process variable. A change in a fractionation process variable will, for example, produce a change in the overhead product stream withdrawn from the fractionation zone, but said change in the product stream will not become apparent until a period of time has elapsed. This period of time is known as dead time and is detrimental to process control systems because of excessive phase shift. Dead time in a process can be defined as the time elapsed between the initiation of a change in a process and the detection of the effect of the change upon the process.

Accordingly, an object of this invention is to provide an improved method of and apparatus for controlling a process.

Another object of this invention is to provide an improved method of and apparatus for controlling a process whereby the effect of process dead time is reduced to a minimum.

Another object of this invention is to provide an improved method of and apparatus for controlling a process wherein a combination feed forward and feed backward method of control is employed.

Other objects, advantages, and features of my invention will be readily apparent to those skilled in the art from the following description and appended claims.

Broadly, I have discovered a method of and apparatus for controlling a process whereby a process variable is adjusted in response to a measurement representative of the effectiveness of said process, and said process variable further adjusted in response to a predictive change in said process.

Figure 1:
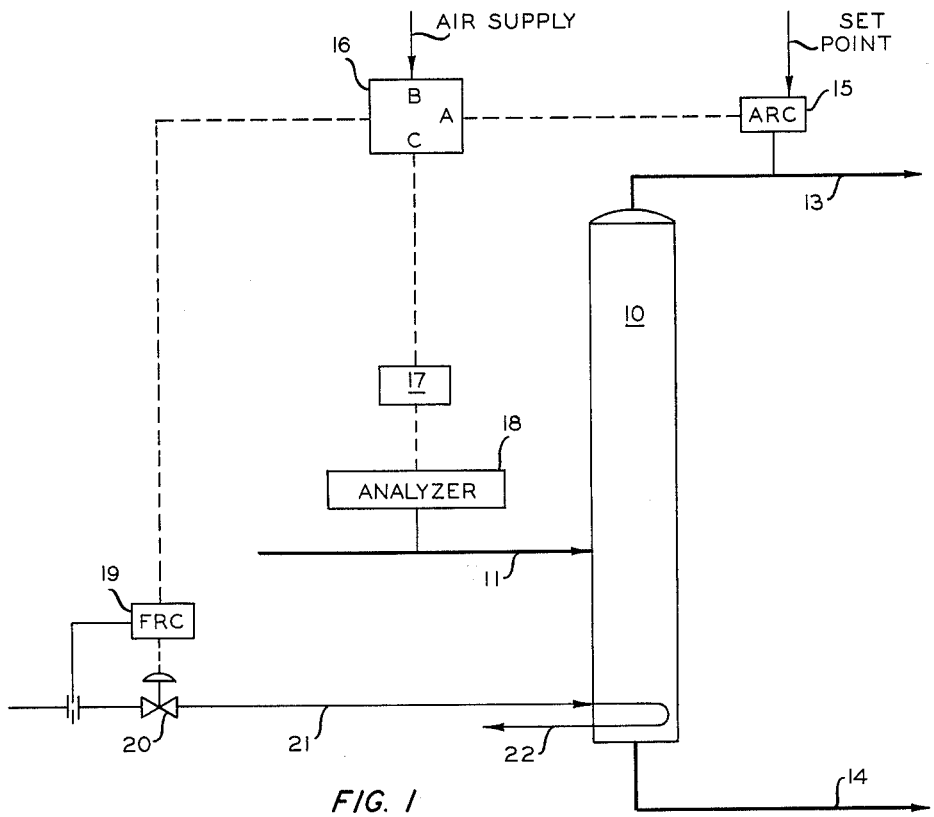
FIGURE 1 is a schematic representation of one embodiment of the inventive control method.

Referring to FIGURE 1, there is illustrated the inventive method of controlling the operation of a fractionator 10. A raw feed is passed to fractionator 10 via conduit means 11. An overhead product stream is withdrawn from fractionator 10 via conduit means 13, and a residual product stream withdrawn from fractionator 10 via conduit means 14. A heating medium is passed to fractionator 10 via conduit means 21 and withdrawn via conduit means 22.

The composition of the overhead product stream in conduit 13 is determined by a conventional analyzer-recorder-controller 15. The analyzing means of analyzer-recorder-controller 15 can, for example, be comprised of a chromatographic analyzer and peak reader. The measured composition is compared with the set point of the controller, said set point representative of a desired composition. Analyzer-recorder-controller 15 transmits a signal to a computing relay 16 which is received as an input A. Relay 16 is an instrument, such as a pneumatic Moore M/F adding relay illustrated in Bulletin 631 distributed by Moore Products Company, Philadelphia, Pennsylvania, which is capable of solving the following equation:

$$\text{Output} = A - C + B$$

where A, B and C are variable input pneumatic signals.

An analyzing means 18, such as a chromatographic analyzer and peak reader, is provided to determine the composition of the raw feed to the fractionator 10 in conduit 11. As such, analyzer 18 transmits a signal in response to the concentration of a constituent in the raw feed stream to a shaped-pulse generator 17, said shaped-pulse generator 17 hereinafter more fully described. A signal is transmitted from shaped-pulse generator 17 to computing relay 16 as C input to said relay.

A constant pneumatic pressure is passed from an air supply source as input B to relay 16. A, B and C input signals are combined within computing relay 16 and an output signal transmitted to a conventional flow-recorder-controller 19 which adjusts valve 20 so as to increase or decrease the rate of flow of the heating medium through conduit 21 responsive to the A and C inputs to relay 16.

In response to a change in the raw feed to fractionator 10 as noted by analyzer 18, shaped-pulse generator 17 transmits a signal initially undisturbed from analyzer 18 to relay 16. Thereafter, shaped-pulse generator 17 causes the signal representative of the change to fade to zero. A shaped-pulse generator thus operates so that as each signal representative of a composition change is applied to the input of the shaped-pulse generator, the output of the shaped-pulse generator will respond by first transmitting the signal representative of the composition change. This output signal is maintained for a desired period of time and then permitted to return back to the original value that existed before the input signal to the shaped-pulse generator was changed.

Figure 2:
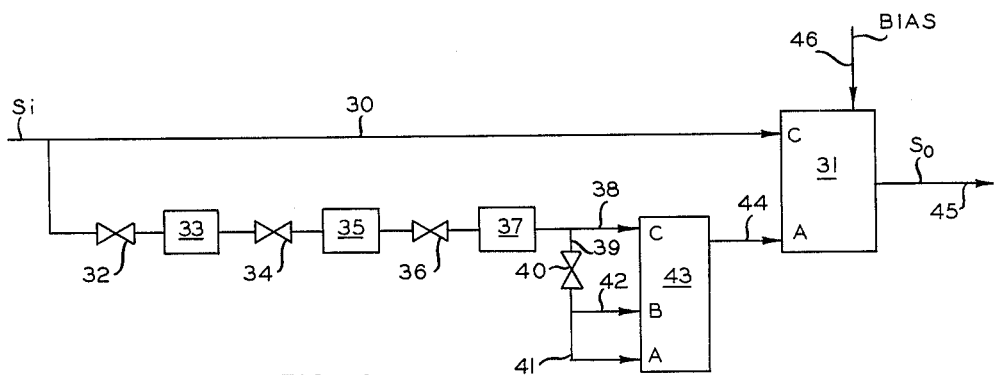
FIGURE 2 is a schematic representation of the shaped-pulse generator of FIGURE 1.

In order to more fully understand the operation of the shaped-pulse generator 17, reference is made to FIGURE 2. FIGURE 2 illustrates a method of pneumatically performing the operation of a shaped-pulse generator. There is shown two pneumatic computing relays, 31 and 43, such as Foxboro M56-1 adding relays illustrated in Technical Information Bulletin 37–A–57A distributed by Foxboro Company, Foxboro, Massachusetts. Each of the said relays is capable of solving the following equation:

$$\text{Output} = A - C + B$$

where A, B and C are pneumatic input variables.

An input pneumatic signal $S_i$ is transmitted to computing relay 31 by means of conduit 30. Input signal $S_i$ is also transmitted to computing relay 43 via conduit, 38, restriction means 32, volume 33, restriction means 34, volume 35, restriction means 36, and volume 37 as an input variable C. In addition thereto, input signal $S_i$ is also transmitted to computing relay 43 via conduit 39, restriction means 40 and conduit 42 as input variable B, and as input variable A via conduit 41. An output pneumatic signal is transmitted from computing relay 43 via conduit 44 to computing relay 31 as an input variable A. A bias pneumatic pressure is continuously transmitted to computing relay 31 via conduit 46 as an input variable B. An output signal $S_o$ is transmitted from computing relay 31 via conduit 45.

Restriction means 32, 34, 36 and volume means 33, 35 and 37 will have the response of a third order exponential lag. This determines the shape or rate of decay in the output signal transmitted by shaped-pulse generator 17 responsive to a change in the composition of the raw feed in conduit 11. It is, of course, within the scope of this invention to employ other type lags, depending upon the dynamic of the control process. For example, the arrangement of restriction means 32, 34, 36 and volumes 33, 35 and 37 result in what is conventionally known as a third order interacting exponential lag. These can, if the process dictates, be second order, fourth order, etc. Non-interacting lags can also be utilized. For a non-interacting lag, each individual lag element (restriciton means 32 and volume 33 constitute a single lag) can be isolated with a conventional isolation relay.

Conduits 38, 39, 41, 42, restriction means 40 and computing relay 43 provide a means of simulating the dead time of the fractionation process. As illustrated, it is assumed that dead time of the fractionation process is of the first order. It is within the scope of this invention to employ shaped-pulse generators for processes having dead times of the second and higher orders. Reference is made to a copending application Serial No. 95,089, filed March 13, 1961, for methods of pneumatically simulating process dead times of the second and higher orders. For a more detailed discussion of the pneumatic shaped-pulse generator, reference is made to a copending application entitled, "A Method of and Apparatus for Improved Process Control," by D. E. Lupfer, filed June 12, 1961.

Although the inventive control method as illustrated is based upon transmitting a signal representative of an input variable change initially undisturbed from shaped-pulse generator 17, it is within the scope of this invention to provide a means of delaying this signal should the dynamics of the controlled process require a signal delay. Said signal delay can be effectuated by, for example, passing the signal from analyzer 18 through a lag means (at least one restriction and volume in series) before passing the signal to shaped-pulse generator 17.

It is within the scope of this invention to electronically provide a shaped-pulse by conventional methods and to employ the electronically generated shaped-pulse in the inventive control system.

To best illustrate the inventive control method, reference is made to the fractionation of a $C_3+$ hydrocarbon feed stream to produce an overhead stream containing a pentane concentration of 1.0 volume percent. An increase in the pentane concentration of the overhead stream to 1.2 volume percent, as determined by analyzer-recorder-controller 15, causes a signal to be transmitted to relay 16 and thence to flow-recorder-controller 19 to thereby close valve 20 and reduce the flow of heating medium to conduit 21.

Assuming that the composition of the raw feed to fractionator 10 is changed, the effect upon the composition of the overhead product stream will be delayed by a time equal to the dead time of the fractionation process. If, for example, the concentration of butane and lighter hydrocarbons in the raw feed stream to fractionator 10 is reduced, an increase in the concentration of pentane in the overhead product stream in conduit 13 will not result until the process dead time has elapsed. Assuming that the analyzer-recorder-controller now operates in the conventional feed back manner, the flow of heating medium through conduit 21 is now reduced in order to return the concentration of pentane in the overhead product stream to the desired 1.0 volume percent. A period of time elapses before the effect of reducing the flow of heating medium to fractionator 10 effectively reduces the concentration of the pentane in the overhead product stream to the desired control level. Should the composition of the raw feed stream to fractionator 10 again be changed, the control cycle of operation would again be repeated resulting in excessive phase shift.

By employing the inventive method of control, a change in the composition of the raw feed to the fractionator is noted by analyzer 18 and a signal representative of said change is passed to shaped-pulse generator 17. As previously noted, shaped-pulse generator 17 initially transmits this signal undisturbed to relay 16 and gradually causes this signal representative of the composition change to decay to zero. By combining the signal passed from the shaped-pulse generator 17 and the signal transmitted by analyzer-recorder-controller 15, the rate of flow of heating medium through valve 20 is effectively adjusted in response to the change in composition of the raw feed and the composition of the overhead product stream. In this manner, adjustment of the flow of heating medium to fractionator 10 is made as the raw feed of changed composition is passed to fractionator 10, without waiting for the change to be reflected in the overhead product stream in conduit 13. As this adjustment of the rate of flow of the heating medium is gradually withdrawn, final control resides with the composition of the overhead product stream in conduit 13. The inventive control system thus comprises a combination of a feed-forward and a feed-backward method of control.

If, for example, a change in composition of the raw feed to fractionator 10 indicates that the flow of heating medium to fractionator 10 should be increased, a signal representative of this change is transmitted to relay 16 in the aforementioned manner. If at the same time the composition of the overhead product stream indicates that the flow of heating medium to fractionator 10 should be reduced, a signal representative of this is transmitted to relay 16. The signal transmitted by relay 16 cntrolling the rate of flow of heating medium to fractionator 10 is responsive to both determinations, reducing the effect of process dead time to a minimum. The flow of heating medium may be increased, depending upon the relative values of the input signals to relay 16, and as the signal representative of the raw feed composition change is withdrawn, the flow of heating medium becomes responsive solely to the composition of the overhead product stream.

Although a pneumatic relay has herein been illustrated, it is within the scope of this invention, to include an electronic method of and apparatus for performing the functions of relay 16. It is also within the scope of this invention to substitute other instruments, such as a conventional blind controller, capable of performing the functions of relay 16.

The inventive method of control can be employed to control any process wherein a process variable representative of the effectiveness of the process is measurable, a change in a process variable representative of a predicted effect upon the process is measurable, and a process variable is manipulatable. The inventive control method can be utilized, for example, to control an absorber wherein the overhead product stream from the absorber is analyzed, the lean oil temperature to the absorber is determined, and the flow of raw feed to the absorber controlled responsive to said overhead measurement and said lean oil temperature. The inventive method of control is particularly applicable when the predictive analysis is made of the process variable having the greatest fluctuation.

As will be evident to those skilled in the art, various modifications of this invention can be made, or followed, in the light of the foregoing disclosure and discussion without departing from the spirit or scope thereof.

I claim:

1. A method of controlling a process which comprises measuring a first output process variable representative of the effectiveness of said process, establishing and transmitting a first signal representative of said measurement as input A to a computing zone, said computing zone solving the equation $$\text{Output} = A - C + B$$

where A and C are input signals and B is a constant, measuring a second input process variable having a predictive effect upon said process, establishing and transmitting a second signal representative of said second process variable measurement to a shaped signal pulse zone, said shaped signal pulse zone initially establishing and transmitting a third signal representative of the change in said second process variable measurement to said computing zone as said input signal C and finally causing said third signal to decay to zero responsive to the dead time of said process, establishing and transmitting a fourth signal from said computing zone representative of said computing zone output to a means of manipulating a third input process variable having a predictive effect upon said process, and manipulating said third input process variable in response to said measurement of said first process variable and said change in said second process variable.

2. The method of claim 1 wherein said third signal initially transmitted from said shaped signal pulse zone is a time delayed signal.

3. Apparatus comprising, in combination, means for measuring an output process variable representative of the effectiveness of a process, a computing means for solving the equation $$\text{Output} = A - C + B$$

where A and C are input signals to said computing means, and B is a constant, means for establishing and for transmitting a first signal representative of said measurement as said input signal A to said computing means, means for measuring a second input process variable having a predictive effect upon said process, means for providing a shaped signal pulse, means for establishing and for transmitting a second signal representative of said second process variable measurement to said shaped signal pulse means, said means for providing a shaped signal pulse comprising means responsive to said second signal for establishing and transmitting initially an output signal representative of a change in said second process variable measurement to said computing means as said input C and decay means for finally causing said shaped signal pulse means output signal to decay to zero responsive to the dead time in said process, said decay means comprising a lag means determining the rate of decay of said shaped signal pulse means output signal and a dead time simulation means for simulating the dead time of said process, means for manipulating a third input process variable of said process, and means responsive to said computing means output for establishing and transmitting a fourth signal representative of said computing means output to said means for manipulating, said manipulating means manipulating said third process variable responsive to said computing means output.

4. In a fractional distillation system comprising, in combination, a fractional distillation column, means for introducing a fluid mixture to be fractionated to said column, means for withdrawing an overhead fraction from said column, and means for withdrawing a bottom fraction from said column; a control system comprising means for measuring a property of said overhead fraction representative of the composition thereof, a computing means for solving the equation $$\text{Output} = A - C + B$$

where A and C are input signals to said computing means and B is a constant, means responsive to said measurement for establishing a first signal and for transmitting said first signal representative of said measurement to said computing means as said input A, means for measuring a property of said fluid mixture which is representative of the composition thereof, a shaped signal pulse means, means responsive to said fluid mixture measurement for establishing a second signal and for transmitting said second signal representative of the composition of said fluid mixture to said means for providing a shaped signal pulse, said means for providing a shaped signal pulse comprising means responsive to said second signal for establishing and transmitting initially an output signal representative of the change in the composition of said fluid mixture to said computing means as said input C and decay means for finally causing said shaped signal pulse means output signal to decay to zero responsive to the dead time in said fractional distillation column, said decay means comprising a lag means determining the rate of decay of said shaped signal pulse means output signal and a dead time simulation means for simulating the dead time of said fluid mixture composition change, means for manipulating a temperature of said fractional distillation column, and means responsive to said computing means output for establishing and transmitting a signal representative of said computing means output to said means for manipulating, said manipulating means manipulating said temperature responsive to said computing means output.

5. In a fractionation process which comprises passing a raw feed to a fractionation zone, withdrawing from the upper region of said fractionation zone a first product stream, and withdrawing from the lower region of said fractionation zone a second product stream; a method of control which comprises measuring a property of said first product stream which is representative of the composition thereof, establishing and passing a first signal representative of said measurement as an input signal A to a computing zone, said computing zone solving the equation $$\text{Output} = A - C + B$$

where A and C are input signals and B is a constant, measuring a property of said raw feed to said fractionation zone which is representative of the composition thereof, establishing and passing a second signal representative of the raw feed composition to a means of providing a shaped signal pulse, establishing and passing initially a third signal from said shaped signal pulse means representative of a change in said raw feed composition as said input signal C to said computing zone and finally causing said third signal to decay to zero with the rate of decay responsive to the process dead time in said fractionation zone, and establishing and passing a fourth signal representative of said computing zone output from said computing zone to a means of adjusting the temperature of said fractionation zone, thereby adjusting a temperature of said fractionation zone in response to said measurements of said raw feed and first product streams and the dead time of said process.

References Cited by the Examiner

UNITED STATES PATENTS

| | | | |
|---|---|---|---|
| 2,464,346 | 3/1949 | Richardson | 236—91 |
| 2,511,022 | 6/1950 | Strysko | 236—91 |
| 2,837,286 | 6/1958 | Ross | 137—85 X |
| 2,900,312 | 8/1959 | Gilmore | 202—160 |
| 3,018,230 | 1/1962 | Morgan | 202—160 X |
| 3,020,213 | 2/1962 | Lupfer | 202—160 |
| 3,126,904 | 3/1964 | Ciarlariello | 137—85 |

OTHER REFERENCES

"An Introduction to Process Control System Design," A. J. Young, 1955, Longmans Green, pp. 306–328 (copy in Library of Congress).

"Automatic Control," vol. 7–8, May 1958, pp. 43–48 (copy in Science Library).

NORMAN YUDKOFF, *Primary Examiner.*

ALPHONSO D. SULLIVAN, *Examiner.*